United States Patent [19]
Hamblen

[11] Patent Number: 5,745,289
[45] Date of Patent: Apr. 28, 1998

[54] ATHERMALIZED DIFFRACTIVE OPTICAL ELEMENTS

[75] Inventor: David P. Hamblen, Rochester, N.Y.

[73] Assignee: Eastman Kodak Company, Rochester, N.Y.

[21] Appl. No.: 668,166

[22] Filed: Jun. 21, 1996

[51] Int. Cl.$^6$ ........................................ G02B 1/18
[52] U.S. Cl. ........................... 359/565; 359/569; 359/570; 359/575; 359/900
[58] Field of Search ........................... 359/356, 565, 359/569, 570, 571, 575, 742, 900

[56] References Cited

U.S. PATENT DOCUMENTS

| | | | |
|---|---|---|---|
| 5,078,513 | 1/1992 | Spaulding et al. | 385/14 |
| 5,208,701 | 5/1993 | Maeda | 359/574 |
| 5,223,978 | 6/1993 | Burkhart et al. | 359/569 |
| 5,260,828 | 11/1993 | Londono et al. | 359/565 |
| 5,349,471 | 9/1994 | Morris et al. | 359/565 |
| 5,371,570 | 12/1994 | Morris et al. | 355/53 |

FOREIGN PATENT DOCUMENTS

WO 93/20464  10/1993  WIPO ................................. 359/565

OTHER PUBLICATIONS

G. P. Behrmann and J. P. Bowen, *Influence of temperature on diffractive lens performance*, Applied Optics 32,(14)2483 (1993), May 1993.

Dean Faklis and G. Michael Morris, *Difractive Lenses in Broadband Optical System Design*, Designer's Handbook, Photonics Spectra, 131 (1991). Dec. 1991.

Dean Faklis and G. Michael Morris, *Optical Design With Diffractive Lenses*, Designer's Handbook, Photonics Spectra, 205 (1991). Nov. 1991.

Carmina Londono, et al., *Athermalization of a single–component lens with diffractive optics*, Applied Optics 32,(13)2295 (1993). May 1993.

Athermalization of a single–component lens with diffractive optics, Carmina Londono, William T. Plummer & Peter P. Clark, Applied Optics, vol. 32, No. 13, May 1993–pp. 2295–2302 Chapter 1, 2.

Patent Abstracts of Japan–vol. 013, No. 509 (E–846), Nov. 15, 1989 and JP 01 206682A (Omron Tateisi Electron Co), Aug. 18, 1989.

Primary Examiner—Paul M. Dzierzynski
Assistant Examiner—John Juba, Jr.
Attorney, Agent, or Firm—Svetlana Z. Short

[57] ABSTRACT

A diffractive optical element, ("DOE"), and particularly a diffractive lens having annular zones about an optical axis and known as a Fresnel zone plate or kinoform lens, is athermalized so that its effective focal length ("EFL") does not shift substantially with temperature over a temperature range by, respectively, increasing and decreasing the zone widths with respect to widths which are optimized to focus at the EFL at room temperature. Half of the zones (alternate, adjacent zones) provide the correct EFL for the expanded condition of the lens at the hot end of the temperature range; the other half of the zones provide correct EFL for the contracted condition of the lens at the cold end of the temperature range. The exact spacings and zone widths are obtained, in the same manner as a diffractive lens is corrected for spherical and chromatic aberration, from the coefficients of the equation governing the phase shift through the lens as a function of radial distance from the optical axis, by averaging the aberration properties at the hot and cold ends of the range, the net effect of which is to dictate the spacing of alternate, successive zones which are slightly greater and less than the zone spacings optimized at room temperature, respectively.

30 Claims, 9 Drawing Sheets

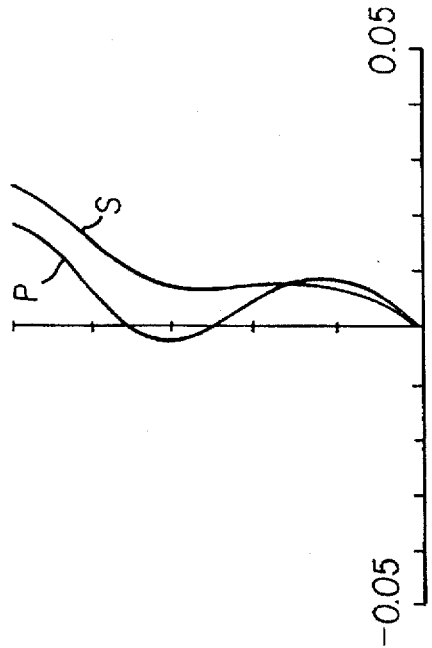
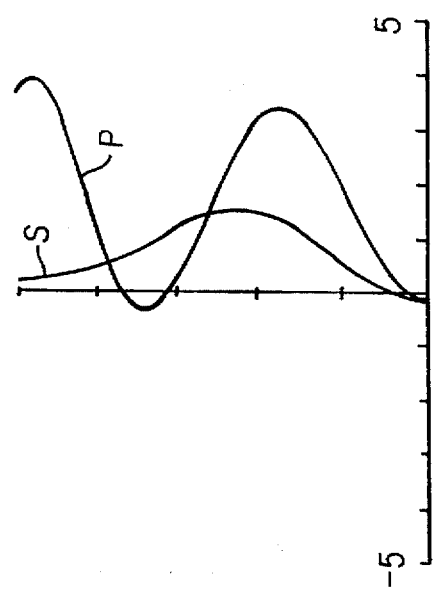
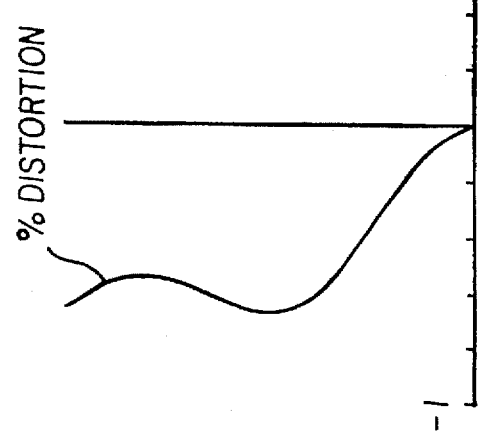
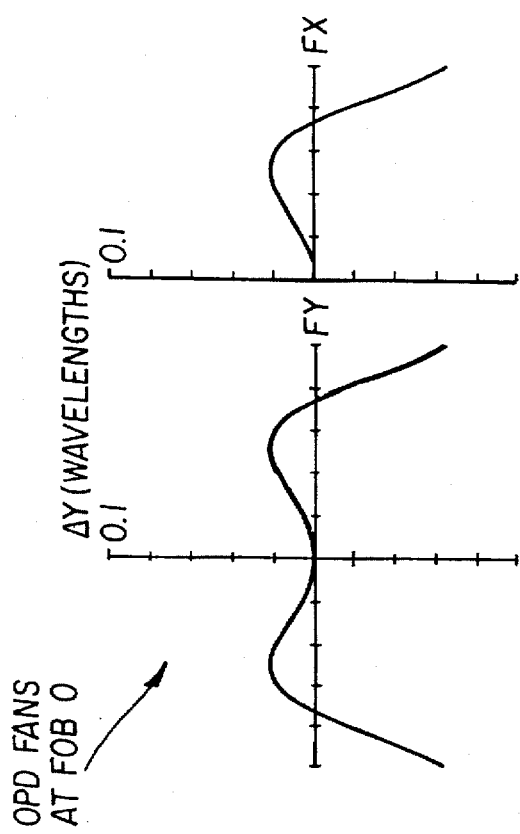

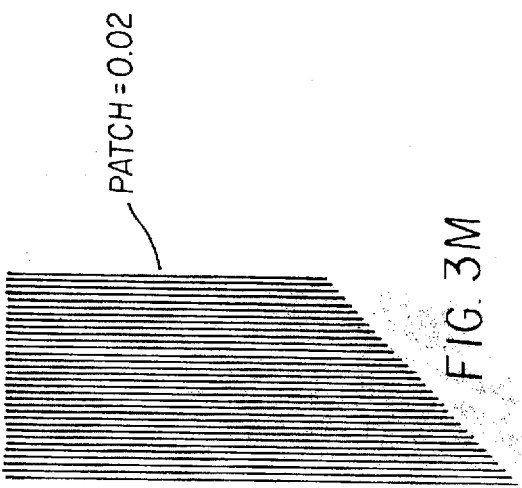
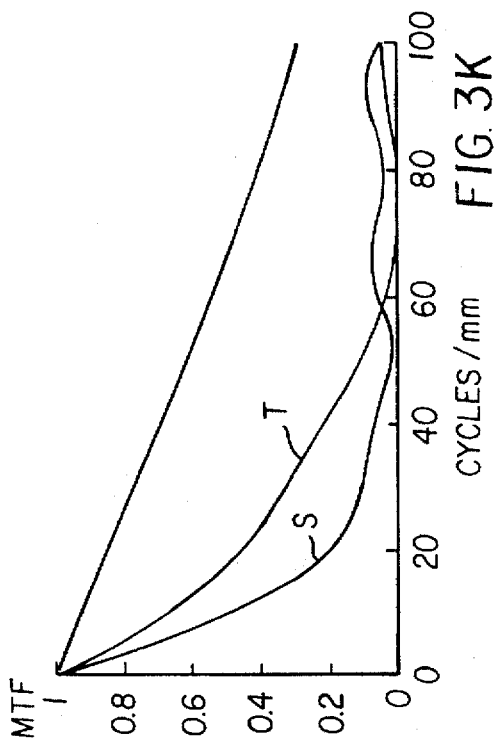
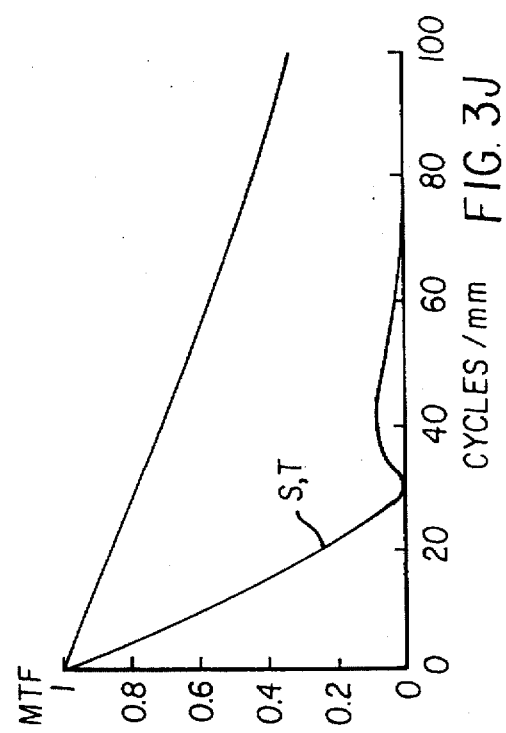
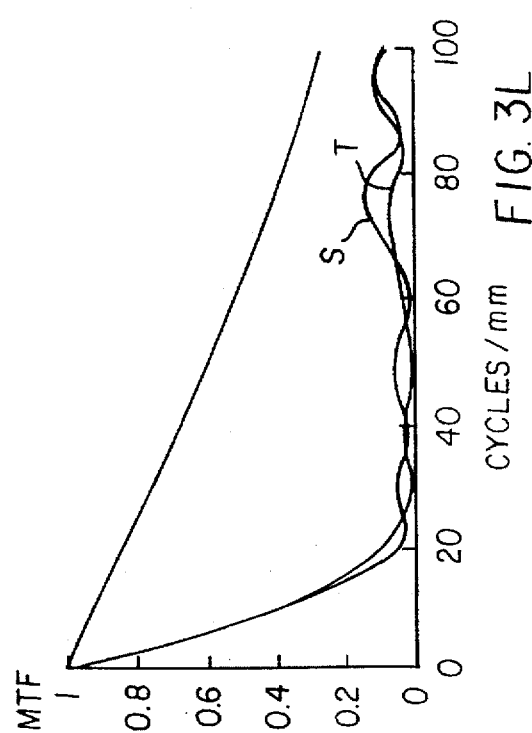

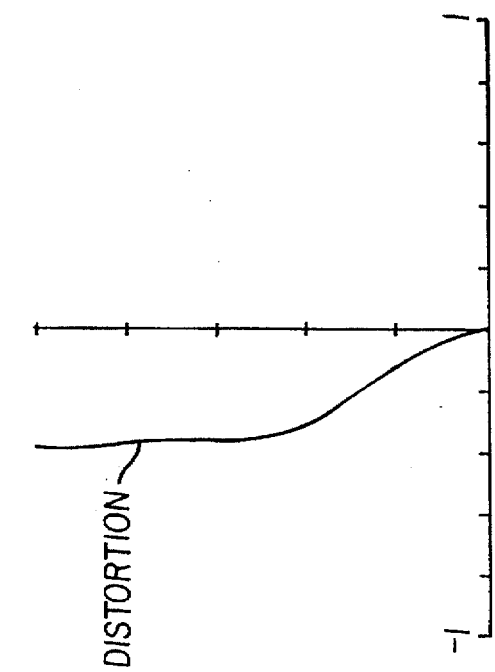
FIG. 3P
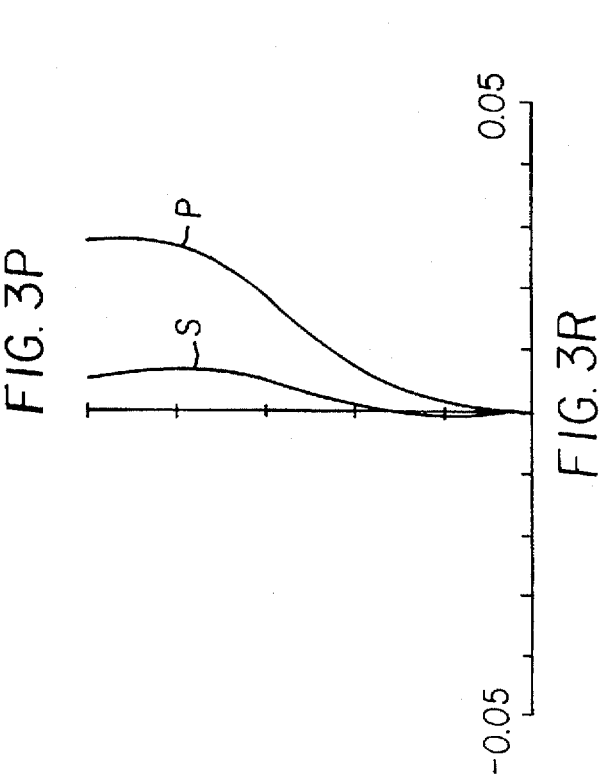
FIG. 3R
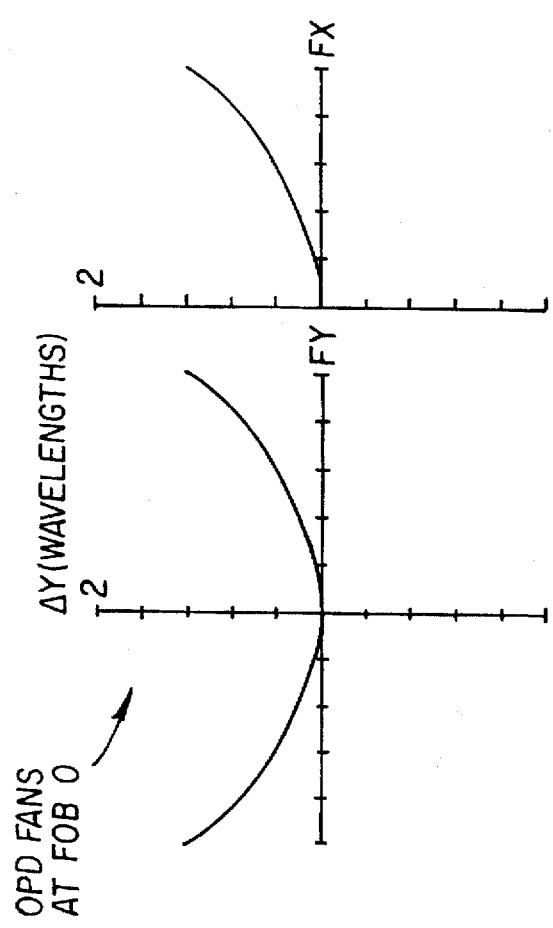
FIG. 3O
FIG. 3N
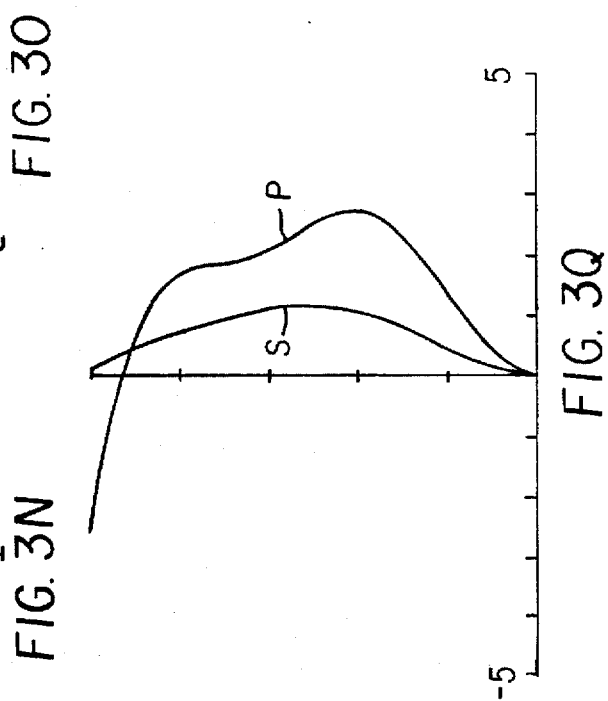
FIG. 3Q

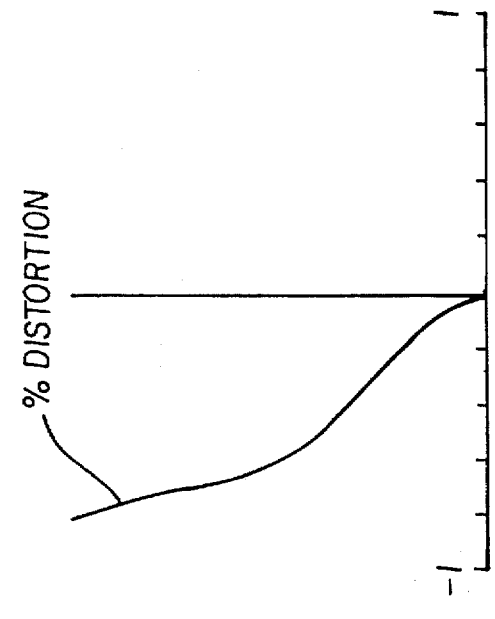
FIG. 3Y
FIG. 3AA
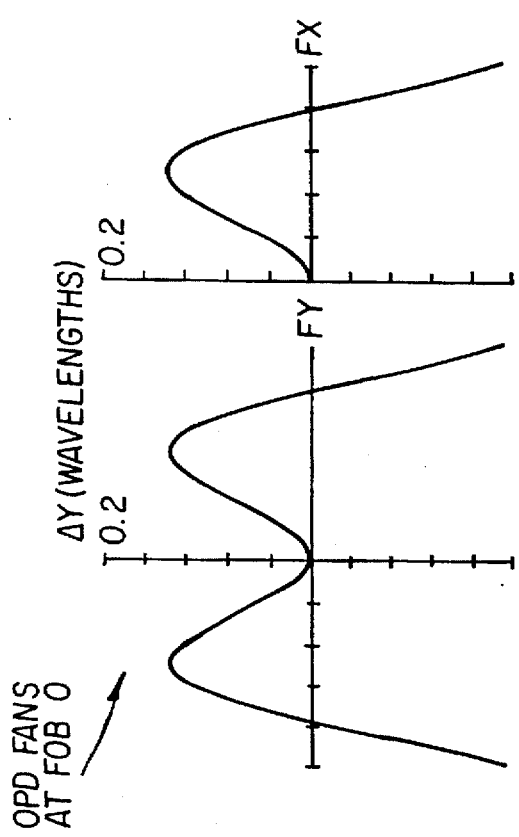
FIG. 3X
FIG. 3W
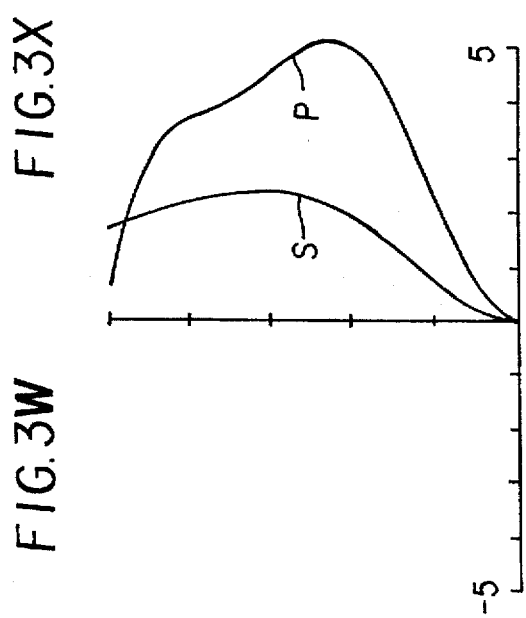
FIG. 3Z

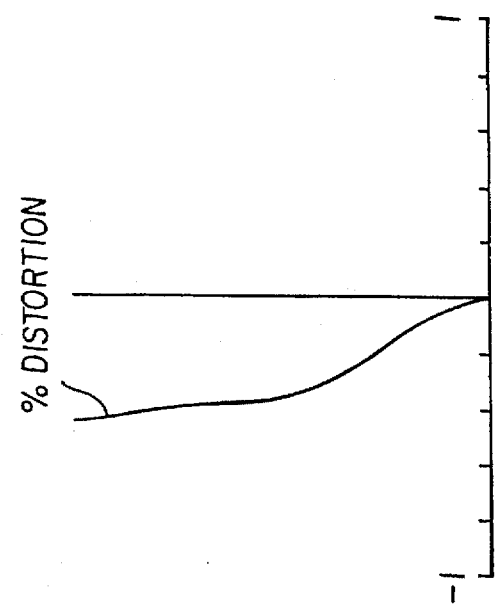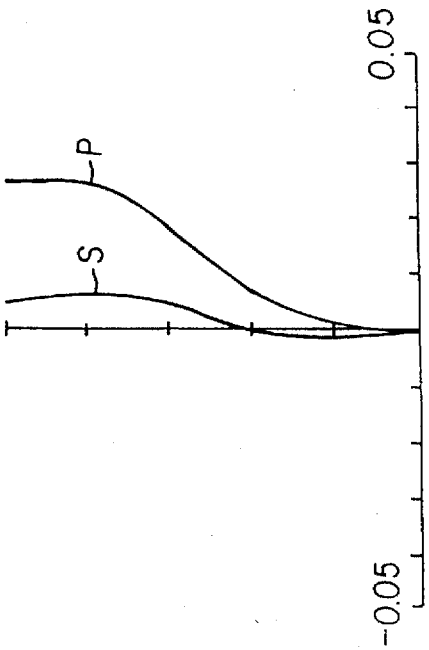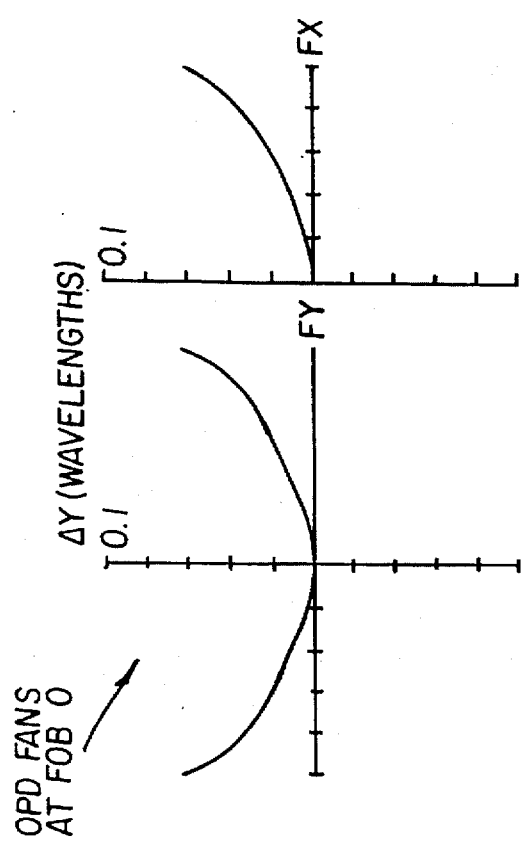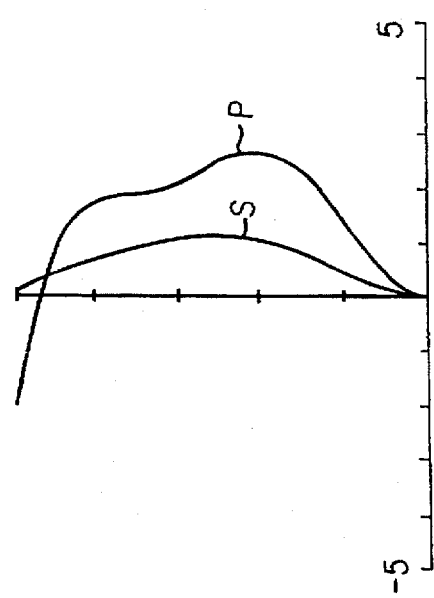

ATHERMALIZED DIFFRACTIVE OPTICAL ELEMENTS

FIELD OF THE INVENTION

The present invention relates to diffractive optical elements ("DOEs") and particularly diffractive lenses. The invention provides a diffractive lens which is athermalized so that it maintains its effective or back focal length to an image plane ("EFL") over a temperature range extending above and below room temperature, and a method of making such an athermalized diffractive lens.

The invention is especially suitable for use in providing diffractive field lenses which image an object over a wide enough field of view to be useful in photographic cameras, and has the advantage of providing such a lens which is corrected for spherical and chromatic aberration as well as aberration due to thermal expansion and contraction.

BACKGROUND OF THE INVENTION

Various types of hybrid diffractive/refractive lenses and a proposal for athermalizing such lenses appears in U.S. Pat. No. 5,260,828 issued to Londono, et al., on Nov. 9, 1993. Athermalization, as proposed in the patent, is based upon the power (the reciprocal of the focal length) of the refractive part of the hybrid lens changing in an opposite sense to the power of the diffractive part of the lens, with changes in temperature. The Londono, et al. patent provides power compensation by designing both parts of the lens with sufficient power so that the sum of the powers provides the desired power notwithstanding thermal expansion and contraction of the body of the lens. The zone spacings are optimized for room temperature and are not changed to compensate for changes in power due to thermal expansion and contraction.

SUMMARY OF THE INVENTION

In accordance with the invention, athermalizing is obtained to the annular grating lines by making slight differences in the zone widths (the radial distance in the case of a diffractive lens) so that they differ from the zone widths for the optimum room temperature design. Compensation occurs because, over a temperature range, expansion and contraction in the zone dimensions compensates for thermal expansion/contraction effects over the range. At the same time, the zone spacings provide for minimizing spherical and chromatic aberration as well as for maintaining focus (EFL and power). In a DOE lens having a plurality of zones which are adjacent to each other and are spaced successively in a radial direction from the optimum axis of the lens, alternate zone spacings are increased and decreased from zone spacing for the optimum room temperature design. The spacings are also selected so as to achromatize the lens and correct for spherical aberration and may also be corrected for coma astigmatism distortion and field curvature ("Petzval") aberration.

Accordingly, it is an object of the present invention to provide an improved DOE.

It is a still further object of the present invention to provide an improved DOE which is athermalized over a temperature range, and to an improved DOE lens which maintains focus over this range notwithstanding increases or decreases in dimensions with thermal expansion and contraction.

It is a still further object of the present invention to provide an improved diffractive/refractive hybrid lens which is suitable for use as a field lens in photographic camera applications.

It is a still further object of the present invention to provide an improved diffractive lens in which spherical and chromatic aberration is corrected along with maintenance of focus over a desired temperature range, which may be at least 15° C. above and below room temperature in optical material such as glass and plastics, and even germanium for infrared applications.

It is a still further object of the present invention to provide an improved DOE lens having fewer zones than lenses such as shown in the above reference Londono patent.

Briefly described, the invention provides an improved diffractive optical element and method of manufacturing same and utilizes a body of optically transmissive material subject to changes in dimensions with temperature. The body has at least on one surface thereof, a plurality of lines which define a DOE. In the case of a DOE lens, these lines may be annular lines about an optical axis of the lens and may be the steps of a blaze having ramps which define the radial zone spacing of the lens. The zone spacing or width between the lines is varied as a function of temperature in an amount sufficient to athermalize the DOE across a range of temperature.

BRIEF DESCRIPTION OF THE DRAWINGS

The foregoing and other objects, features and advantages of the invention as well as presently preferred embodiments thereof will become more apparent from a reading of the following description in connection with the accompanying drawings:

FIGS. 3A to I show the design's performance without athermalization in accordance with the invention at room temperature to form comparison with the performance of the athermalized lens at room temperature (FIGS. 3J to R), at −15° C. (FIGS.>S to AA), and at +15° C. (FIGS. AB to AJ).

DETAILED DESCRIPTION

Normal diffractive zone spacing, r, is defined by a phase polynomial $\phi(r)$, given by the equation $$\phi(r) = (2\pi/\lambda)(S_1 r^2 + S_2 r^4 + \ldots S_{n+1} r^{2n}) = 2\pi m \quad (1)$$

where $S_1 \ldots S_{n+1}$ are aspheric coefficients of the emerging wavefront, m is the order number, and $\lambda$ is the design (central) wavelength. Physical construction consist of blazed zones, which are ramps with circular-shaped heights of steps. These interact with incident light to function as phase transformations, since each zone gives an optical phase difference of $2\pi$.

Refractive/diffractive hybrid lenses are optimized to focus at room temperature. Zonal radii enclose equal areas (Fresnel Zone Plates) and therefore expand or contract in accordance to whether the lens is heated or cooled. The effect of temperature change is for the lens to lose some of its required focal ability. To compensate for temperature, according to this invention, a change is made in construction by modifying the normal zonal spacings. That is, zone spacings for an athermalized lens takes into account dimensional changes through use of discrete adjustments in the S-coefficients. With this technique, one-half of the alternating zones are in their correct focal position for either the expanded or contracted temperature variations when the bulk lens changes dimension. This is done by recalculating the S-coefficients, Eq. 1, to compensate for thermal shifts over an expected temperature range.

When a lens expands or contracts, its volume, refractive index, and surface curvatures change. Lens thickness and diameter expands or contracts. Spherical surfaces remain spherical, and aspheric surfaces become more or less aspherical. Focal lengths increase/decrease with respect to temperature changes that decrease/increase, respectively.

Figure 1:
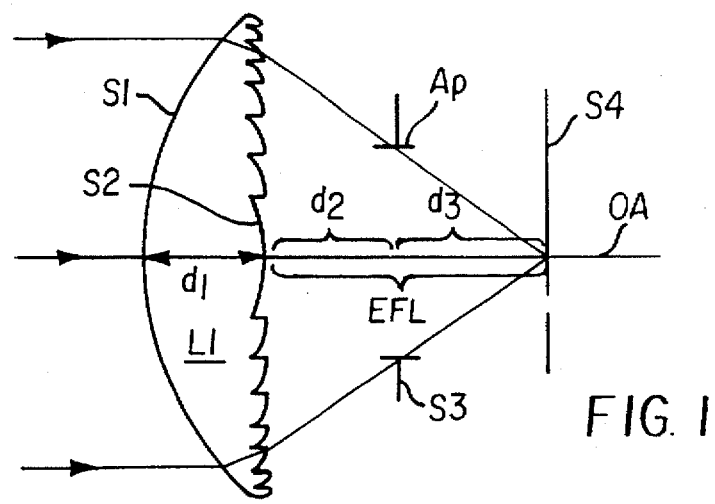
FIG. 1 is a diagrammatic cross-section of a hybrid refractive/diffractive singlet embodying the invention.

FIG. 1 shows a DOE lens on a plano surface (S2) of a body (L1) of optically transmissive material, such as any of the materials mentioned in the Londono patent referenced above. There are several zones around the optical axis (OA). An aperature Ap restricts the field on the image side of the lens. The body L1 between vertices had a thickness $d_1$ (TH1). The aperature to rear vertex spacing is $d_2$ (TH2). The EFL to the center of the curved image (Camera focal) plane is $d_1+d_2=$TH3. For clarity, the zonal radii along the diffractive surface are much enlarged. Of course, at the scale of the drawings, zone heights and spacings would not be visible. The on-axis zone always has the largest step interval; while widths between successive zones become closer together as their radii increase outward to full aperture. The paraxial approximation to the size of zonal radii $r_m$ and blaze height $h_{max}$ are given by the equations $$r_m=(2m\lambda fo)^{1/2}, h_{max}=\lambda/[n(\lambda o)-1], \quad (2)$$

where fo is the paraxial focal length or EFL, and $\lambda o$ is the central or design wavelength. Zone radii progressively enlarge according to Eq. 2, while areas encompassed between annular zones are equal. For an athermalized lens this relationship is no longer used, and alternating zones will have a slightly staggered pattern in radial distances from the optical axis.

To athermalize the DOE lens, zone spacings are first calculated by minimizing aberrations at room temperature. Over the temperature range of interest, two sets of S-coefficients are calculated, employing optimizations by additional optical design. To athermalize the lens, that is, to compensate for both thermal conditions, a single phase polynomial is now recalculated from these sets of two additional phase polynomials. Resulting, is a zone spacing which compensates for either temperature condition. This consolidation process can be considered as averaging two aberration properties, giving the best correction through compensation as the temperature changes on either side of room (or design) temperature. Resulting, is zonal spacings that produce a composite design giving satisfactory focal performance over an expected temperature range.

The methodology is explained in connection with FIG. 2; which again shows a few zones centered around the optical axis. Two temperature cases are considered: 1) zone radii expand at temperature $T^1$, and 2) contraction to temperature $T''$; each with regard to a mean temperature $T_o$. On either side of $T_o$, there is a small radial shift, $\Delta_{ps}$ corresponding to $\Delta_{p1}$ (hot) and $\Delta_{p2}$ (cold).

Shifts in radii are calculated from the $\Delta_p$ differentials and radial compensations are made. Alternate zones are chosen as either the expanded or contracted radii in order to construct an augmented set for recalculating the new phase polynomial. For instance: zone #1 (hot) will be fabricated slightly short of its most expanded position by an amount $r_1$ $(T_o)-(\Delta_{p1})$, and the same for all odd-numbered radial zones, #3−$(\Delta p_3)$, —#5−$(\Delta_{p5})$, etc. This will compensate for a temperature raise. Compensation for a lower temperature will increase radii of even-numbered zones a slight amount $r_2$ $(T_o)+\Delta_{p2}$, for radial zone #2, and for successive even-numbered zones #4+$(\Delta_{p4})$, #6 $(\Delta_{p6})$, and etc. The array of alternate zones, even and odd, are tabulated in Chart A below; where sums +$\Delta_p$ (even) and differences −$\Delta_p$ (odd) are chosen in sequence. From this set, a computer program was devised that takes $\Delta_p$ differences and corrects room temperature radii by calculating a new set of S-coefficients. The new set compensates for expansions ore contractions.

In constructing the hybrid lens (L1, FIG. 1), zonal radii may be diamond turned allowing for the requisite $\Delta_p$ offsets. This fabrication is summarized in the charts, A and B, which show alternations required between the original zone spacings $r_1$ $(T_o)$, $r_2$ $(T_o)$ . . . $r_n$ $(T_o)$, and with a new set of radii increasing or decreasing with increments $\Delta_{p1}, . . . \Delta_{pn}$.

Figure 2:
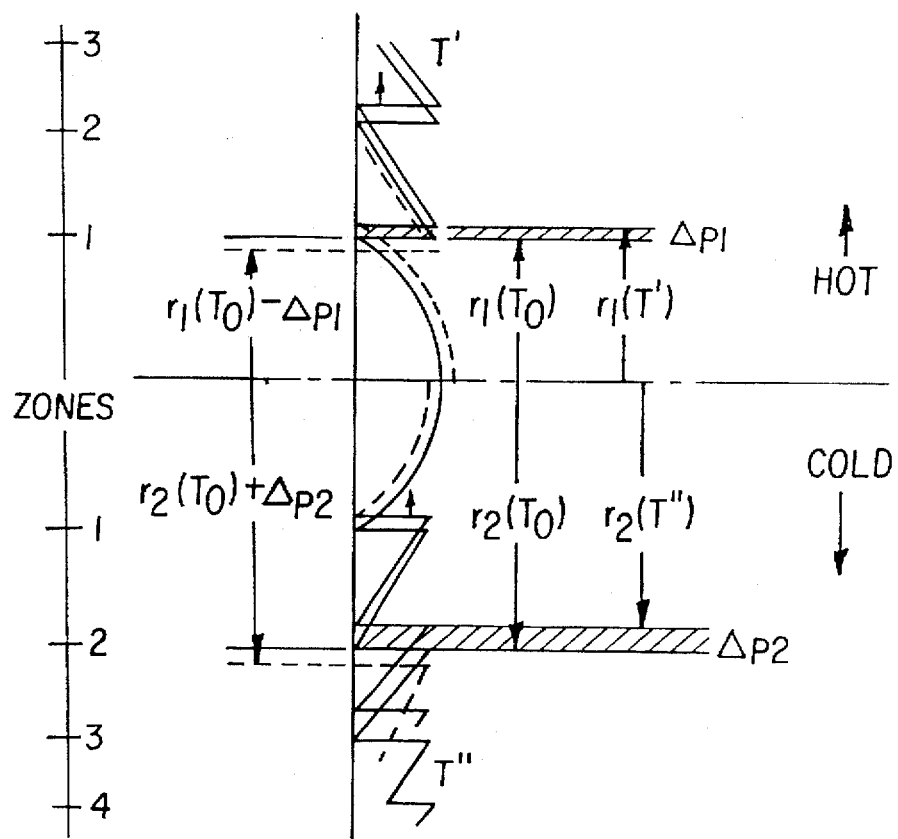
FIG. 2 is a diagrammatic view illustrating the first three zones of the DOE of the lens shown in FIG. 1 showing the spacing of alternate zones being increased and decreased from the spacing at a mean temperature, which may be room temperature, and which illustrates the principle of the invention.

Only a few zones are shown in FIG. 2, but satisfactory performance and athermalization may be provided in a lens with about 10–20 zones.

Consider how the phase coefficients $S_n$ (Eq. 1) can be found, from which the zone widths are determinable using conventional techniques. The change in zone radius $r_m$ can, to first order, be expressed as $$r_m(T)=r_m(1+\alpha_g\Delta T), \quad (3)$$

whereas $\alpha_g$ and $\Delta T$ are the thermal coefficient of expansion of the material and the temperature differential, respectively. The refractive index will change by $$n_o(T)=n_o+(dn_o/dT)\Delta T. \quad (4)$$

Inserting Eq. 3 into the phase polynomial, Eq. 1, the size of zone radii can be calculated from $$S_1(T) = S_1(1 + 2b + b^2) \quad (5)$$
$$\vdots$$
$$S_5(T) = S_5(1 + 10b + 45b^2),$$

generally, $$S_n(T) = S_n(1 + b)^n \quad (6)$$

where $b=\alpha_g\Delta T$. The set of five equations (Equations (5)) are binomial expansions in increasing powers of $r^n$, where higher ordered terms are neglected. Equation (6) is the general equation for the binomial expansion for the S coefficients of the phase equation (1). Changes in zone heights, [Eq. 2] will be negligible.

The set of five temperature altered phase coefficients, Eq. 5, are used to redefine a new athermal phase polynomial, described in the previous topics.

The athermal designed singlet lens provides a hybrid DOE with focal compensation over a prescribed temperature range. Focal aberrations at the film plane which are not acceptable for photographic camera applications can be accommodated by selecting curvatures and S-coefficients.

Chart C presented below indicates the curvatures and coefficients of the diffractive blazed surface on a meniscus lens which is athermalized in accordance with the invention.

In chart C, the first column indicates the surface number, the second column indicates the curvature of the surface and the curvature of the base curve in the case of the DOE. The next column lists the phase coefficients of the DOE from which the zone radii and widths may be obtained in accordance with well known diffractive lens design techniques. The last column specifies the material in terms of index and Abbe number at room temperature and at the design wavelength of the lens which is 546 nm.

Chart A

| Zone | Hot T' | $\Delta p'$ To $\Delta p''$ | COLD T'' |
|---|---|---|---|
| 1 | $r_1'$ | $(-)$ $r_1$ | $r_1''$ |
| 2 | $r_2'$ | $r_2 \, ; (+)$ | $r_2''$ |
| 3 | $r_3'$ | | $r_3''$ |
| 4 | $r_4'$ | $(-)$ $r_3$ | $r_4''$ |
| 5 | $r_5'$ | $r_4 \, ; (+)$ | $r_5''$ |
| 6 | $r_6'$ | $(-)$ $r_5$ | $r_6''$ |
| | | $r_6 \, ; (+)$ | |

Chart B

| Zone | Zonal Radius |
|---|---|
| 1 | $r_1(T_o) - \Delta p_2'$ |
| 2 | $r_2(T_o) + \Delta p_2''$ |
| 3 | $r_3(T_o) - \Delta p_3'$ |
| 4 | $r_4(T_o) + \Delta p_4''$ |
| 5 | $r_5(T_o) - \Delta p_5'$ |
| 6 | $r_6(T_o) + \Delta p_6''$ |

Chart C

| Surf. # | Curvature (mm) | | Coefficients | | Index |
|---|---|---|---|---|---|
| 1 | 0.15890 | | AD | −0.00135 | 1.49170 |
| | | Asphere - | AE | 0.00027 | ($\gamma_a$ = 57.37) |
| | | Eq. (7) | AF | −2.3646E-05 | |
| | $TH_1 = 1.40$ | | AG | 7.5526E-07 | |
| 2 | 0.10883 | | S1 | −3.6363E-04 | |
| | | | S2 | −5.6431E-04 | |
| | | Phase - | S3 | 2.6550E-4 | |
| | | coefficients | S4 | −4.5736E-05 | |
| | | Eq. (1) | S5 | 2.6512E-06 | |
| | $TH_2 = 3.07300$ | (aperture) | | | |
| 3 | $TH_3 = 29.27170$ | (distance to film plane) | | | |
| 4 | −0.00833 | (curved film plane in the long 35 mm format dimension only) | | | |

The asphere for Z(r) of Surface #1 is defined as follows $$Z(r) = \frac{cvr^2}{1 + \sqrt{1 - cvr^2}} + ADr^4 + AEr^6 + AFr^8 + AGr^{10} \quad (7)$$

EP=Exponent $10^P$

Surface #2, number of zones=37

Figure 3B:
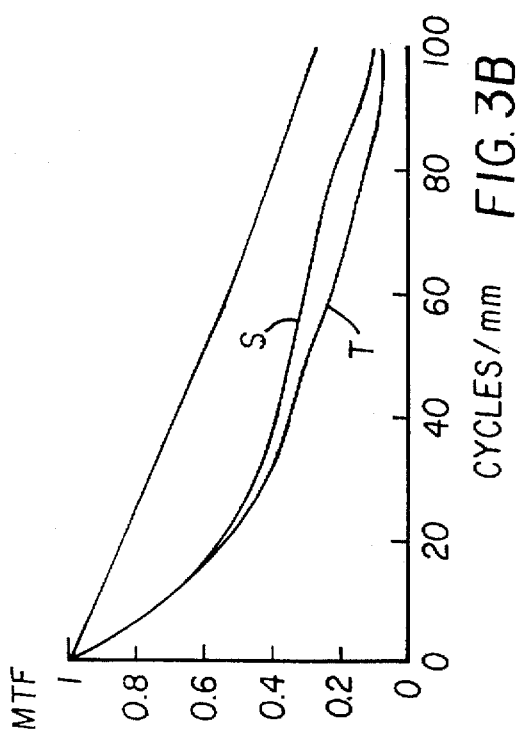
Figure 3D:
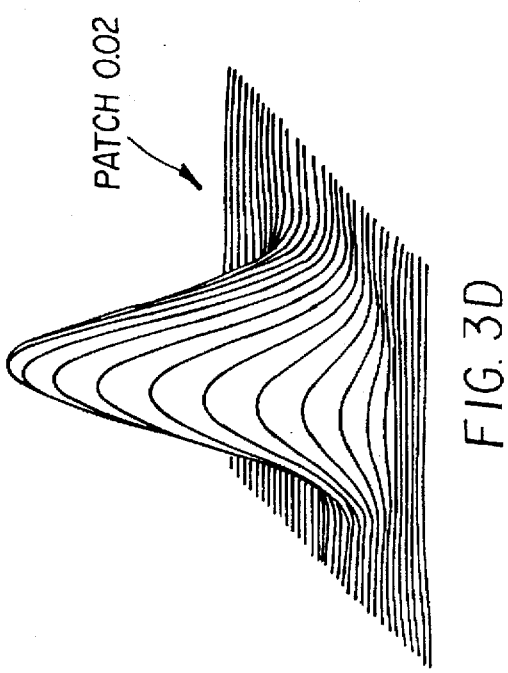
Figure 3A:
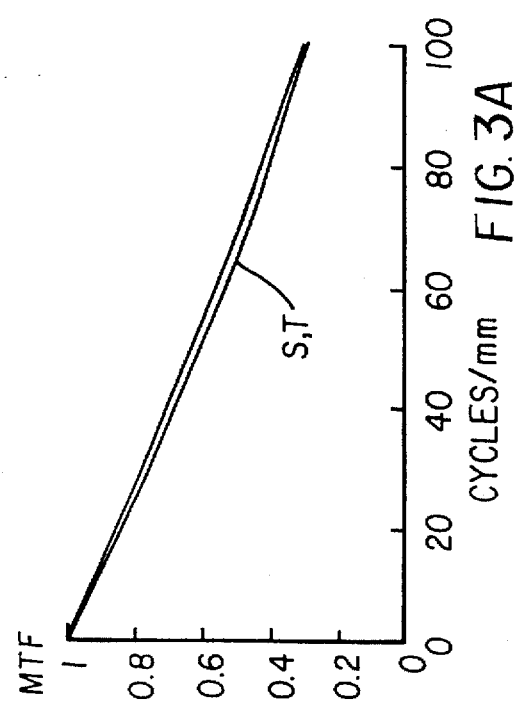
FIGS. 3A to AJ are a series of plots illustrating the performance of a hybrid diffractive/refractive lens (DOE) and particularly the performance of the meniscus lens, the design of which is set forth in chart C presented below.
Figure 3C:
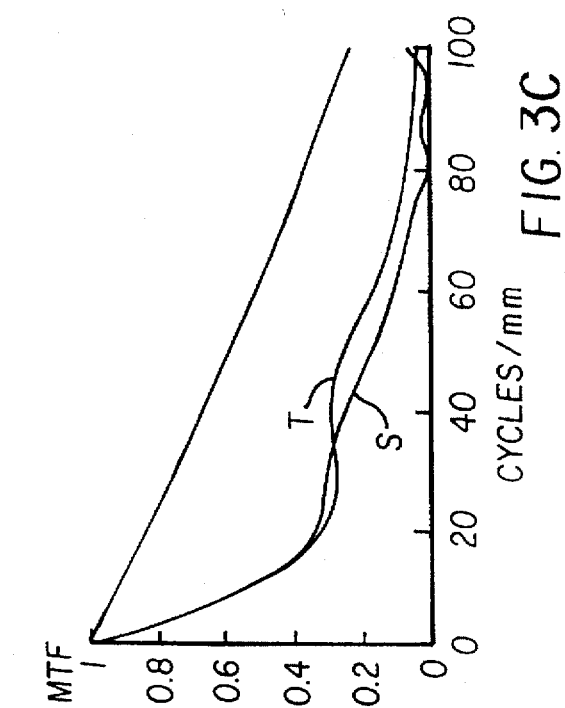
Figure 3T:
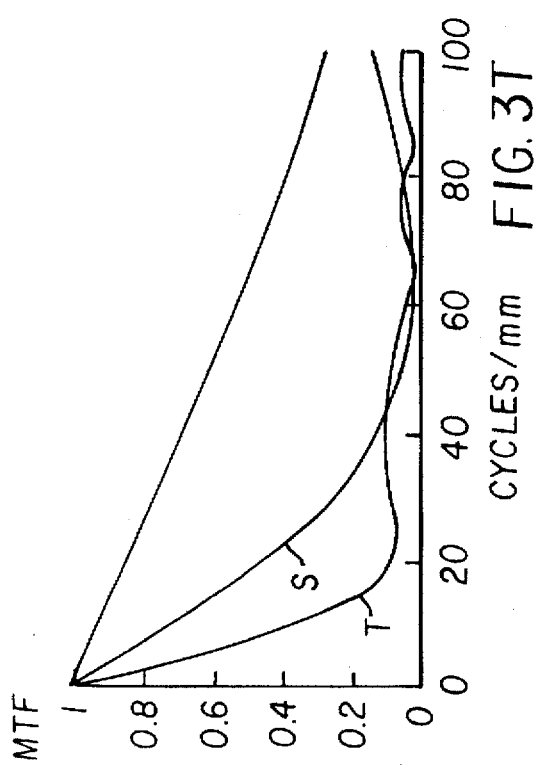
Figure 3V:
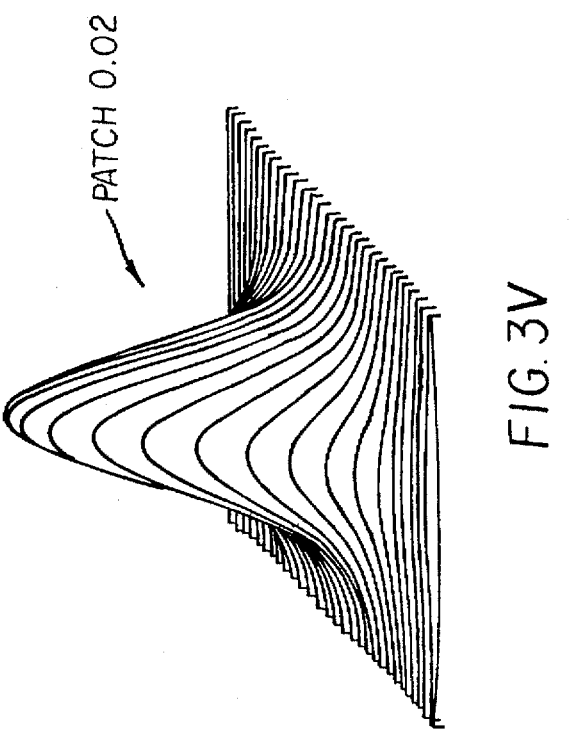

FIGS. 3A–C are MTF performance plots (three) taken at room temperature, To, for an incident wavelength of 546 nm for the lens design without the adjacent zone spacing for athermalizing the lens, which is the case also for the plots of FIGS. D–I. Fractional object heights are: (1) FOB 0 (0° to the optical axis)—See FIG. 3A; (2) FOB 0.7 (22° to the lens axis)—See FIG. 3B; and (3) FOB 0.9 (31-degree field angle)—See FIG. 3C. The curves in each plot are marked with a vertical dash, a square and a triangle for idealized tangential and sagittal measurements, respectively. The exemplary meniscus-type DOE (diffractive optical element) is designed to have an MTF of about 50% modulation at 60-cycles on-axis (scale is in cycles/mm). All field angles, FOB's, shows that the lens performs well as optimized at room temperature To. The top curve (marked with triangles) in all three plots (FIGS. 3A–C) shows the theoretical limit for a diffraction-limited, perfectly designed lens.

FIG. 3D shows point spread function (PSF) plots, which show the energy distribution, on-axis at the central focal spot. The focused beam is well within the design criteria of 30 microns at 50% of maximum intensity (scale in mm).

FIGS. 3E and F are opd fans which show difference in ray paths at the focal plane as a function of light rays transmitted across the lens diameter. There is a small departure from the desired, perfect spherical wavefront, showing astigmatism and coma aberrations, but minimized for a single-element lens (scale in wavelengths).

FIG. 3G is a plot of distortion at the film plane. Acceptable distortion should be no greater than 4% magnification—and is below 1%, in this lens exemplary DOE design (scale in percent).

FIG. 3H shows field sags, namely sagittal and tangential astigmatism that cannot be fully corrected in a simple lens, but is somewhat improved by the exemplary DOE and by using a curved film plane (in the long dimension, scale in wavelengths).

FIG. 3I plots lateral color. This plot shows that correction for chromatic aberration is provided across a spectrum of 440 nm to 650 nm. The lens design optimization includes minimum color separation in the film plane for primary color (blue to red) and secondary (blue to green) wavelengths, scale in mm.

FIGS. 3J–R are plots similar to FIG. 3A–I for the non-athermalized lens at room temperature. There is some degradation of the performance shown in FIGS. 3A–I, in a non-acceptable amount, including point spread function (PSF), 3M.

Figure 3S:
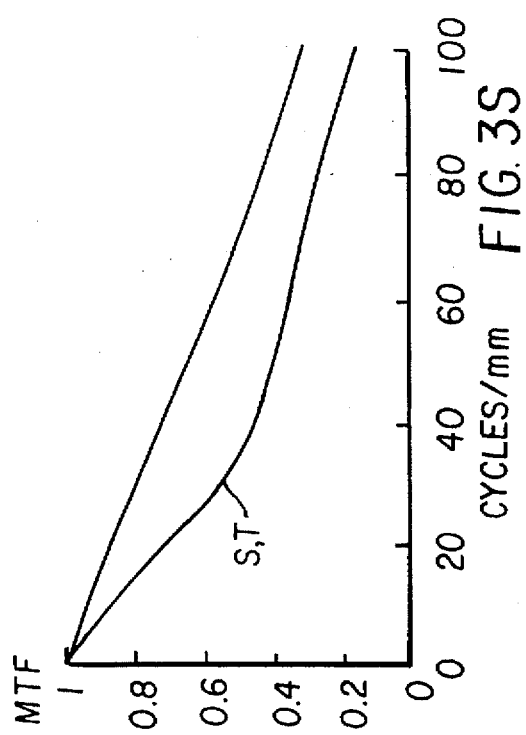
Figure 3U:
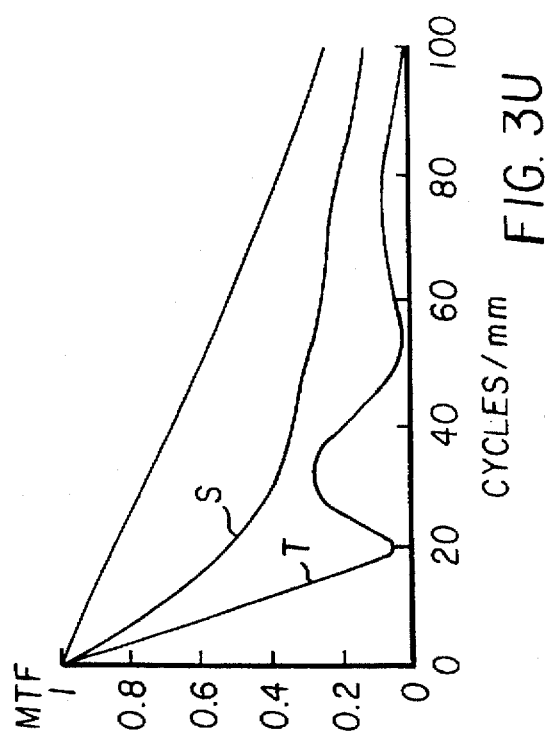
Figure 3A:
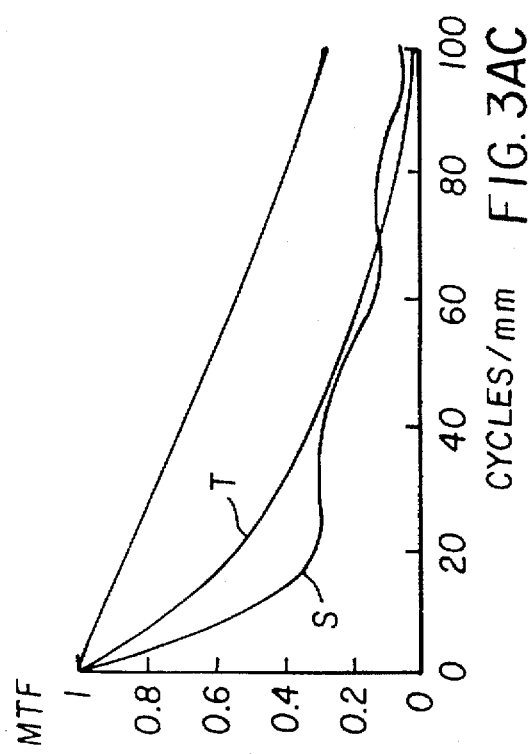
Figure 3A:
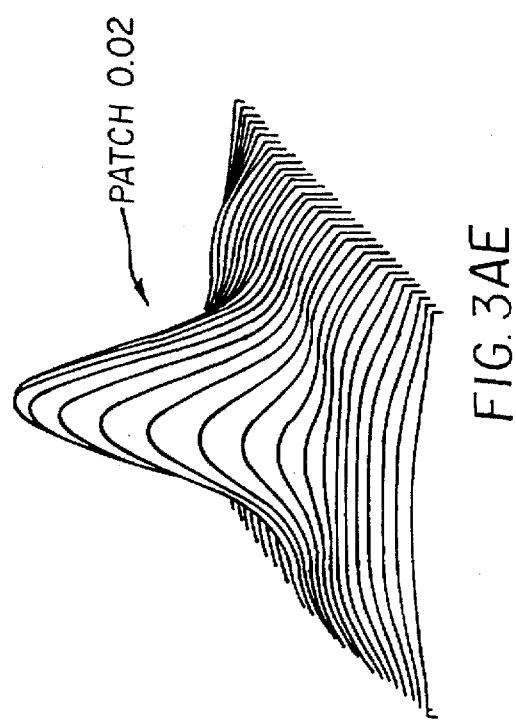
Figure 3A:
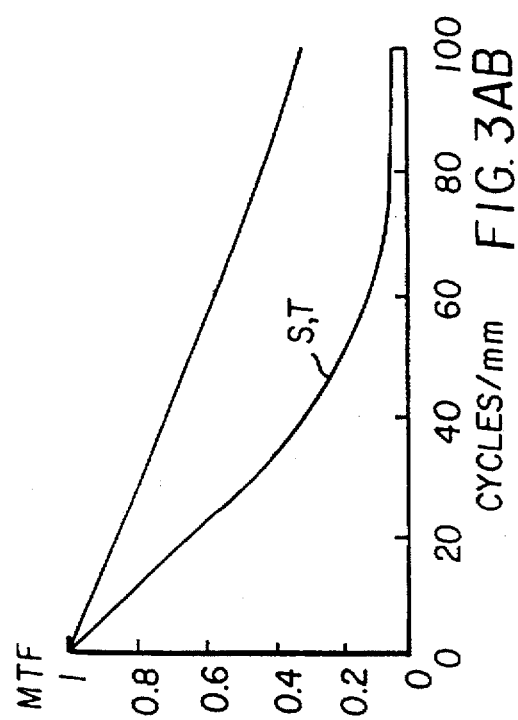
Figure 3A:
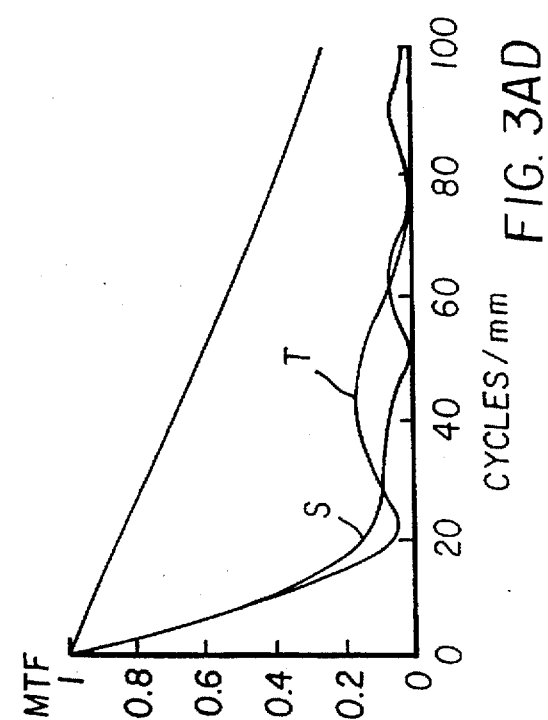

FIGS. 3S–AA are plots similar to FIGS. 3A–I, respectively, taken when the lens is cold (−15° C.).

FIGS. 3AB–AJ are plots similar to FIGS. 3A–I, respectively, taken when the lens is hot (+15° C.).

More specifically, the performance of the athermalized lens at low temperature (e.g., minus 15° below temperature), at room temperature, and at high temperature (e.g., 15° above room temperature) are indicated in the plots of modulation transfer function (MTF) at positions in the field both in the sagittal (x) and tangential (y) directions; as well as other aberrations. For instance, point spread function (PSF) shows a retained focal-spot size near or less than 20 microns root-mean-square diameter (at 50% peak height) over the athermalized range. Other important imaging aberrations are retained within acceptable levels for a single-element lens imaging onto a focal plane, like a film plane. In particular, unequal magnification due to distortion over the image plane is reduced and kept near constant at below 1%. Also of great importance, the kinoform-type lens remains corrected for lateral color, as reflected in plots of primary and secondary aberration taken over a wavelength range extending from 440 nm to 650 nm. Back focal length of the lens is maintained over a range compensating for thermal effects, as reflected in plots of optical path difference (OPD); while astigmatism, field sags, stays within imaging tolerance for a single element lens possessing no other lens elements. The temperature-induced optical response so sited thus illustrates the successful operation of an lens athermalized in accordance with the invention, as an imaging lens.

From the foregoing description, it will be apparent there has been provided an improved DOE and especially a DOE lens which is athermalized over a temperature range. Various embodiments of the invention have been described as well as the best mode of presently known for making such DOEs, thereby practicing in the invention. Variations and modifications in the herein described DOE lenses and methods of manufacturing same, within the scope of the invention, will undoubtedly suggest themselves to those skilled in the art. Accordingly, the foregoing description should be taken as illustrative and not in a limiting sense.

What is claimed is:

1. A method of manufacturing an optical element from a light transmissive body of material, subject to changes in dimension with temperature, which method comprises the steps of determining the nominal location of a plurality of lines on a surface of said body to define the nominal widths of successive zones of a diffractive optical element (DOE);

specifying an actual spacing between adjacent ones of said lines which define the zones of said DOE, said actual spacing being a function of the dimensional changes of said material with temperature such that at least some of the zones of said DOE approach their nominal widths in response to temperature changes in an amount sufficient to athermalize said DOE across a range of temperature; and forming zones on a surface of said body in accordance with said actual spacing, wherein said nominal zone widths are determined at a certain temperature between the lower, colder temperature and the upper, hot temperature ends of said range; and said actual spacings define at least some zones of increased width and some zones of decreased width, with respect to said nominal zone widths at said certain temperature.

2. The method according to claim 1 wherein said step of specifying actual spacing is carried out by sufficiently increasing and decreasing the widths of successive alternate zones, respectively, thereby athermalizing said DOE over said range.

3. The method according to claim 2 wherein said certain temperature is room temperature.

4. The method according to claim 2 wherein said forming step is carried out by blazing said surface to form ramps having sloping portions between steps, which steps define said lines and said sloping portions defining the widths of said zones.

5. The method according to claim 1 wherein said DOE is a diffractive lens having an effective focal length (EFL) along an optical axis, and said forming step is carried out to form said zones as annular zones about said axis.

6. The method according to claim 5 wherein said step of specifying an actual spacing is carried out by sufficiently increasing and decreasing the widths of alternate successive zones which are radially spaced at successively larger radial distances from said optical axis, respectively.

7. The method according to claim 5 wherein spacing between said lines in a radial direction defines annular zones of width having said spacing of said lines, and said step of specifying an actual spacing is carried out to define at least some zones of increased width and some zones of decreased width with respect to the width thereof at a certain temperature between the upper, hot end of said range and the lower, cold end or said range to maintain the EFL approximately constant over said range.

8. The method according to claim 6 wherein said certain temperature is room temperature.

9. The method according to claim 6 wherein said step of specifying an actual spacing is carried out to form said zone widths with spacing sufficient to focus an image over a field in a plane at said EFL, which plane is perpendicular to said optical axis, thereby providing an athermalized, diffractive field lens.

10. The method according to claim 6 wherein said step of specifying an actual spacing is carried out to provide alternate zone widths such that they are of such widths as to provide said EFL, respectively, at the hot and cold ends of said range.

11. The method according to claim 7 wherein said forming step is carried out by blazing said surface to form ramps having sloping portions between steps, which steps define said lines, and said sloping portions defining the widths of said zones.

12. The method according to claim 7 further comprising the step of forming a curved surface on a surface of said body opposite to the surface on which said diffractive lens is formed, thereby providing a hybrid refractive/diffractive lens.

13. The method according to claim 7 further comprising the step of forming said surface with a given curvature to define a base curvature of said diffractive lens.

14. The method according to claim 13 further comprising the step of forming a curved surface on a surface of said body opposite to the surface on which said diffractive lens is formed, thereby providing a hybrid refractive/diffractive lens.

15. The method according to claim 7 wherein said forming step is carried out to provide less than 20 zones at successively increasing spacing from said optical axis.

16. The method according to claim 7 wherein the phase shift through said diffractive lens as a function of radial distance, r, from the optical axis is $$\phi r = (2\pi/\lambda)(S_1 r^2 + S_2 r^4 + \ldots S_{n+1} r^{2n})$$

where $\lambda$ is the design wavelength and $S_n$ are aspherical phase coefficients, and said phase coefficients are selected to compensate for changes in refractive index of the material of said body with temperature and the dimensional changes in said body with changes in temperature in accordance with the following equation $$S_n(T) = S_n(1+b)^n$$

where $b = \alpha_g \Delta T$, where $\alpha_g$ is the thermal coefficient of expansion of the material of said body and $\Delta T$ is the temperature range, and said changing step is carried to space said zones in accordance with said phase coefficients.

17. A diffractive optical element (DOE) which comprises a light transmissive body of material subject to changes in dimension with temperature, a plurality of lines on a surface of said body which define a grating having a plurality of zones, successive ones of which zones are adjacent each other, and the spacings between said lines which define the widths zones differing from each other in an amount sufficient to athermalize said DOE across a range of temperature, wherein at least some of the zones have a width greater than their nominal zone widths at a certain temperature, and at least some of the zones have a width less than their nominal zone widths at said certain temperature, said certain temperature being between the lower, cold temperature and the upper, hot temperature ends of said range.

18. The element according to claim 17 wherein the widths of alternate successive zones are respectively increased and decreased, with respect to said nominal zone widths at said certain temperature, in an amount sufficient to athermalize said DOE over said temperature range.

19. The element according to claim 18 wherein said certain temperature is room temperature.

20. The element according to claim 17 wherein said DOE is a diffractive lens having an effective focal length (EFL) along an optical axis, and said zones are annular zones around said axis.

21. The lens according to claim 20 wherein spacing between said lines in a radial direction defines annular zones of width having said spacing of said lines, and said spacing is sufficient to increase and decrease the width of said zones with respect to the width thereof at a certain temperature between the upper, hot end of said range and the lower, cold end of said range to maintain the EFL approximately constant to over said range.

22. The lens according to claim 20 wherein said widths of successive adjacent zones which are radially spaced at successively larger radial distances from said optical axis, respectively, are increased and decreased with respect to said width at said certain temperature.

23. The lens according to claim 22 wherein said certain temperature is room temperature.

24. The lens according to claim 21 wherein said zone widths are defined by such widths as to focus an image over a field in a plane at said EFL, which plane is perpendicular to said optical axis, thereby providing an athermalized, diffractive field lens.

25. The lens according to claim 21 wherein said alternate widths are such that they provide said EFL, respectively, at the hot and cold ends of said range.

26. The lens according to claim 21 wherein said surface is blazed to form ramps having sloping portions between steps, which steps define said lines and said sloping portions defining the widths of said zones.

27. The lens according to claim 21 wherein said body has opposite surfaces, one of which is a curved surface and the other of which is a surface on which said diffractive lens is formed, thereby providing a hybrid refractive/diffractive lens.

28. The lens according to claim 27 wherein said other surface has a given curvature and defines a base curvature of said diffractive lens.

29. The lens according to claim 21 wherein said spacing provides less than 20 zones at successively increasing spacing from said optical axis.

30. The lens according to claim 17 wherein the phase shift through said diffractive lens as a function of radial distance, r, from the optical axis is $$\phi r = (2\pi/\lambda)(S_1 r^2 + S_2 r^4 + \ldots S_{n+1} r^{2n})$$

where $\lambda$ is the design wavelength and $S_n$ are aspherical phase coefficients, and said phase coefficients are selected to compensate for changes in refrac

* * * * *